US007343534B2

(12) United States Patent
Meaney et al.

(10) Patent No.: US 7,343,534 B2
(45) Date of Patent: Mar. 11, 2008

(54) METHOD FOR DEFERRED DATA COLLECTION IN A CLOCK RUNNING SYSTEM

(75) Inventors: Patrick J. Meaney, Poughkeepsie, NY (US); Kurt A. Grassmann, Jettingen (DE); Oliver Marquardt, Ludwigsburg (DE); Scott B. Swaney, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 10/855,047

(22) Filed: May 27, 2004

(65) Prior Publication Data

US 2005/0268187 A1 Dec. 1, 2005

(51) Int. Cl.
*G11F 29/00* (2006.01)

(52) U.S. Cl. .......................... 714/723; 714/24; 714/25; 714/39; 714/57

(58) Field of Classification Search ................ 714/799, 714/723, 57, 39, 24–25; 370/217, 252
See application file for complete search history.

(56) References Cited

U.S. PATENT DOCUMENTS 6,564,339 B1 * 5/2003 Swoboda et al. ............. 714/30
2002/0144177 A1 * 10/2002 Kondo et al. ................. 714/13
2003/0004980 A1 * 1/2003 Kishi et al. ................. 707/204
2003/0039209 A1 * 2/2003 Webber ...................... 370/217

* cited by examiner

*Primary Examiner*—Guy J. Lamarre
(74) *Attorney, Agent, or Firm*—Lynn L. Augspurger

(57) ABSTRACT

A method for deferred logging of machine data following an error or event in order to capture critical information for that error or event treats the data as persistent and it does not get logged until a disruption occurs to the system (e.g. system reset, restart, deactivation, or powered-down). This way, important debug data can be held in the hardware or software, without a need for complicated hardware and code for logging this debug data. Methods are also disclosed for setting a switch to indicate deferred logging is required, referencing the log data with the original event information, calling home with the debug data, resetting the deferred logging switch, setting the deferred logging switch manually, viewing whether the switch is already set, and supporting different kinds of switches.

15 Claims, 4 Drawing Sheets

101
System (stopped)
102
Service Element
103

501 System running
502 Error detected
503 Running Data logged
504 Refcode issued
later
603 Start IML Deactivation Power-down stop clocks
601 Set logout switch
602 refcode, timestamp
604 Is Switch set?
N
Y
505 IML Deactivation Power-down reset switch
605 Debug Data logged
606 Call home with scan data, refcode, timestamp

METHOD FOR DEFERRED DATA COLLECTION IN A CLOCK RUNNING SYSTEM

FIELD OF THE INVENTION

This invention relates to symmetrical computer systems, and particularly to a method of capturing hardware debug data that is resident in the hardware of a running system at a future time when the running system is intentionally stopped.

TRADEMARKS

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

DESCRIPTION OF BACKGROUND

As components of SMP computer systems become denser, there are increasingly more ways that these computers can experience hardware faults or errors. In order to avoid system outages of these systems, it is vital that these computers have recovery circuitry to allow for such errors.

For each error event, there is often some data that is logged out with the error for isolation of the failing components so the parts can be replaced. Also, this debug data may be used to help isolate the failure or defect down to the suspected circuit or root cause of the failure.

However, it is not always feasible to build hardware to log out all the relevant failure information non-disruptively for all the possible types of failures in a system. For instance, if there is an interface with ECC protection that experiences correctable errors, it is often necessary to identify the failing parts. In general, only the bus isolation (not the bit isolation) is necessary to determine the part to replace.

There is often hardware that is used to trap error information into registers for future debug. However, getting this data out of the machine non-disruptively (i.e. while the machine continues to run) can lead to complicated or expensive hardware as well as simulation effort to make sure this logging hardware works. The process of logging data in a disruptive manner is often very simple (e.g. via LSSD Scan). Also, it is not always clear which data would prove helpful for debug and which data would not be necessary.

Rather than design more hardware to log all the ancillary data, this invention is used to defer the logging of that data until a disruption occurs. Examples of intentional disruptions are manual power-down, activation power-down, or restart. An example of an unintentional disruption is a system checkstop.

Unfortunately, there is often not a lot of control over when an operator of a machine decides to disrupt a machine, thus losing valuable debug data. Once any of these events occur, the debug data is lost due to power loss or scanning new data into the hardware.

SUMMARY OF THE INVENTION

The invention allows for the setting of a flag when particular error events occur. Later, whenever a disruption is about to occur that would reset or otherwise destroy the data in the machine (e.g. power off, scan reset, system reset, deactivation, etc.), the debug data is dumped out and saved as debug data, prior to the actual disruption.

The invention allows for dumping of a portion of the scan ring out. It also allows for saving the timestamp and/or reference event associated with the original error event along with the flag. Thus, the dumped data can later be matched back to the event that triggered the logging of the extraneous data.

The invention allows for other forms of logging. For instance, when a software-related error occurs, it may be too risky to dump out the trace information. Instead, the trace information is written to memory and can be logged out later, when the system is about to power-down anyway. This way, if there is a failure with the memory logging, there are no critical jobs running.

The invention also allows for the automatic resetting of the flag after logout so the data is not overlaid with useless reset data in the future. This flag can also be reset when powering on a machine.

These and other improvements are set forth in the following detailed description. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
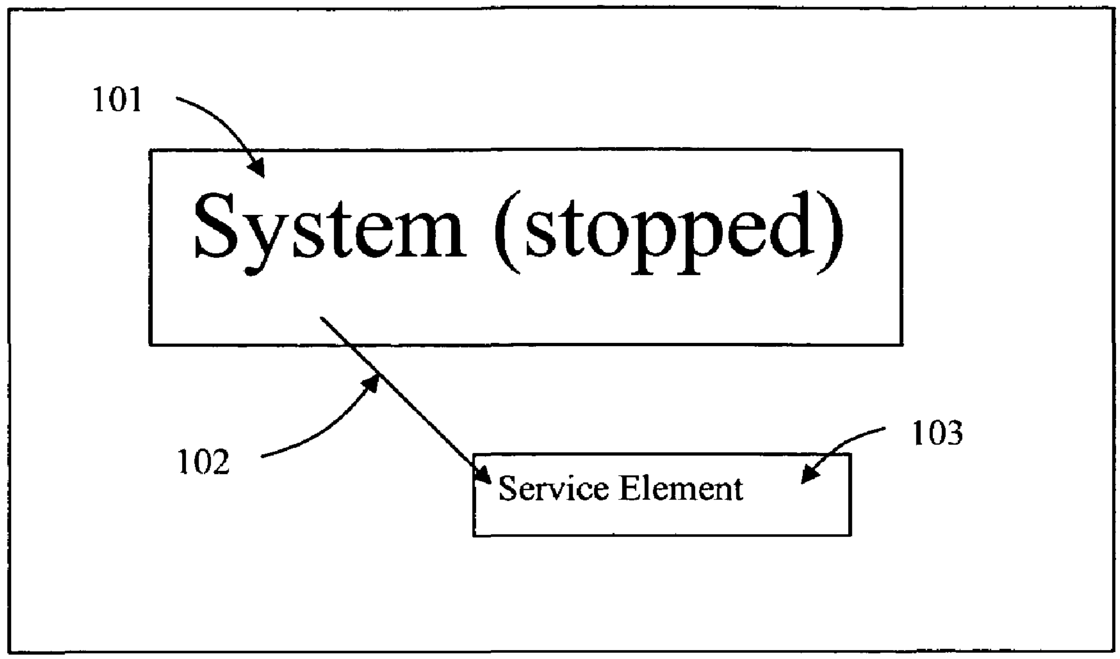
FIG. 1 illustrates one example of logging data out of a stopped computer system.

Turning to FIG. 1, notice that there is a computer system, 101, in the preferred embodiment an IBM zSeries system, that is in a stopped state. Data from said stopped system, 101, is logged through stopped system logging method, 102, to the service element, 103. One example of a stopped system logging method, 102, is LSSD scanning.

Figure 2:
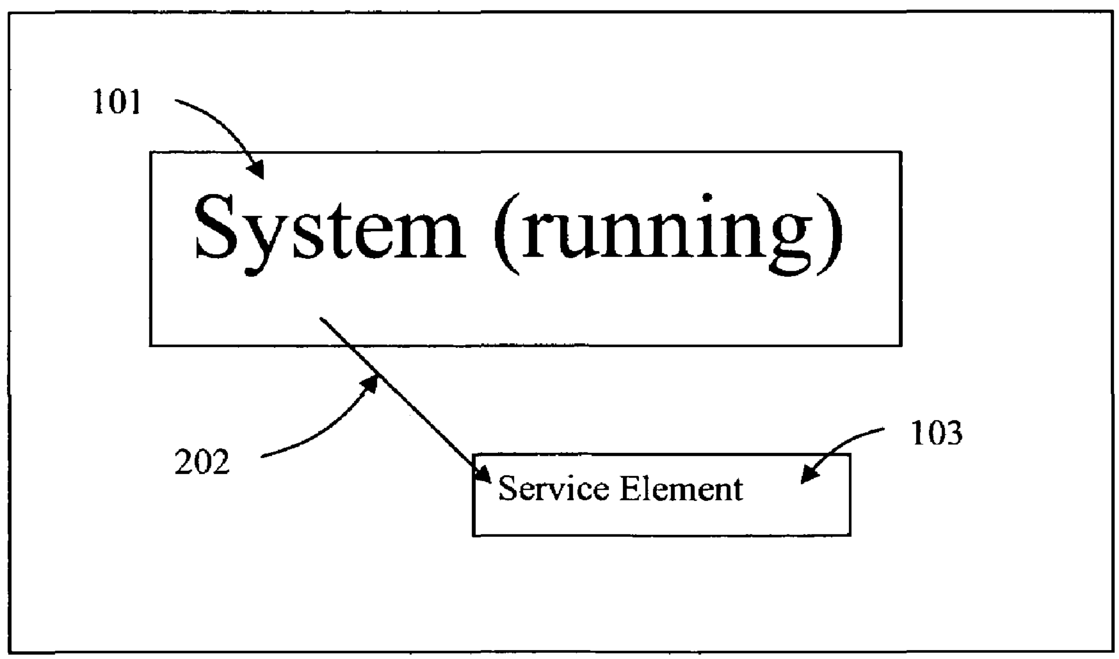
FIG. 2 illustrates one example of logging data out of a running computer system.

Turning to FIG. 2, notice that there is a computer system, 101, that is in a running state. Data from said running system, 101, is logged through running system logging method, 202, to service element, 103. One example of a running system is using a clock serial interface.

Figure 3:
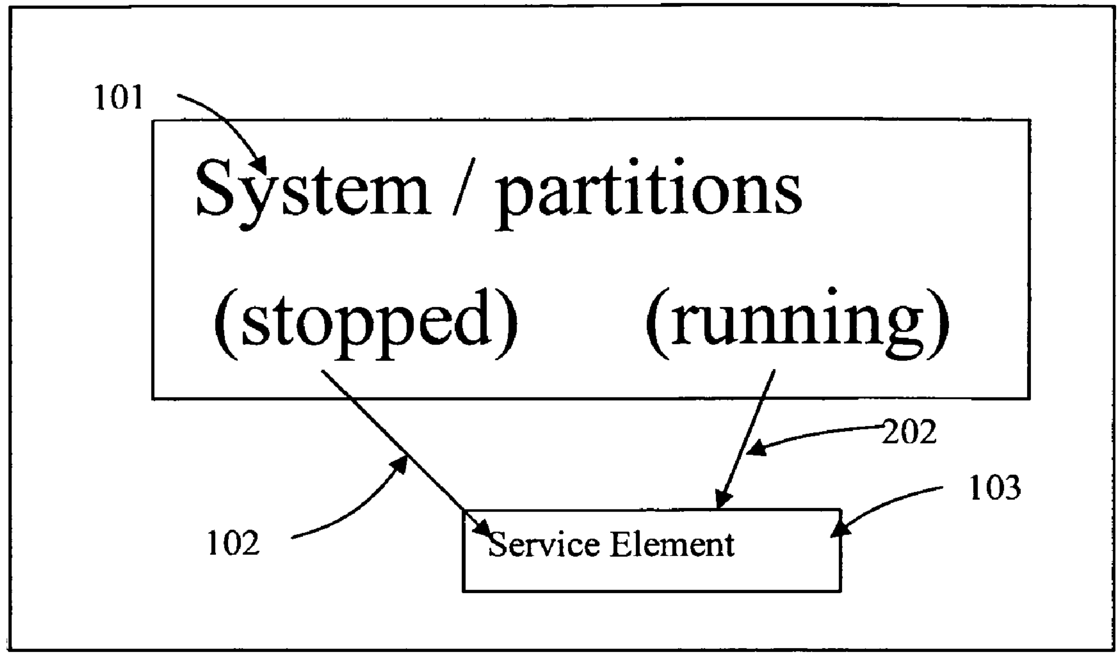
FIG. 3 illustrates one example of logging data out of a stopped partition of a system and logging separate data out of a running partition.

Turning to FIG. 3, notice that there is a computer system, 101, that has two partitions, one in a stopped state, and one in a running state. Data from said stopped partition is logged through stopped system logging method, 102, to the service element, 103, while different data from the running partition is logged through running system logging method, 202, to the service element, 103.

Figure 4:
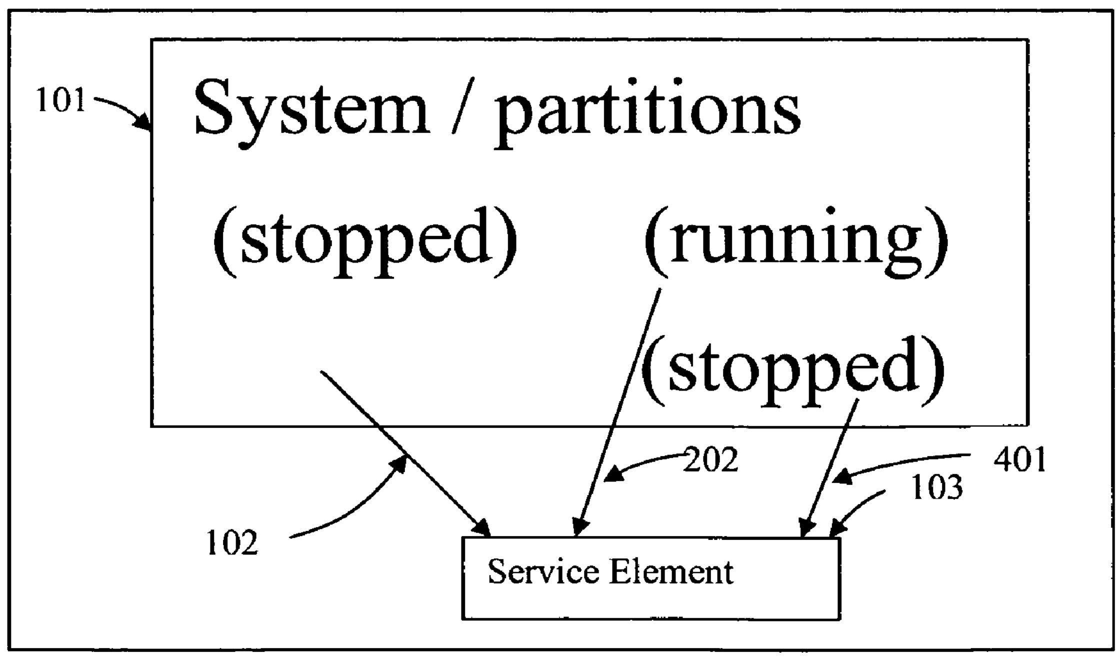
FIG. 4 illustrates one example of logging data out of a stopped partition of a system, logging separate data out of a running partition, and later logging the remaining data out of the running partition after it is stopped.

Turning to FIG. 4, notice that there is a computer system, 101, that has two partitions, one in a stopped state, and one in a running state. Data from said stopped partition is logged through stopped system logging method, 102, to the service element, 103, while different data from the running partition is logged through running system logging method, 202, to the service element, 103. At some time later, the running partition is stopped and data is logged through stopped system logging method, 401, to the service element, 103.

Figure 5:
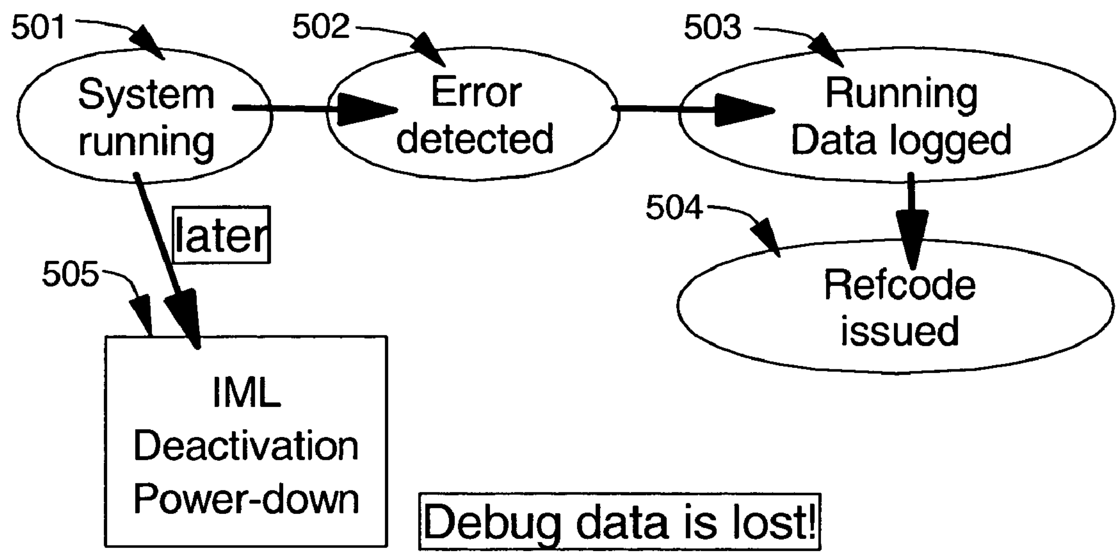
FIG. 5 illustrates one example of prior art process for logging running data followed by power-down which destroys remaining data.

Turning to the prior art depicted in FIG. 5, notice that there is a running system, 501. An error event is detected, 502, data is logged, 503, and a reference code is issued, 504. This reference code, 504, is used to track the error event, 502. Later, when an Initial Machine Load (IML), power-down, or restart occurs, 505, the remaining data in the system, 501, is lost.

Figure 6:
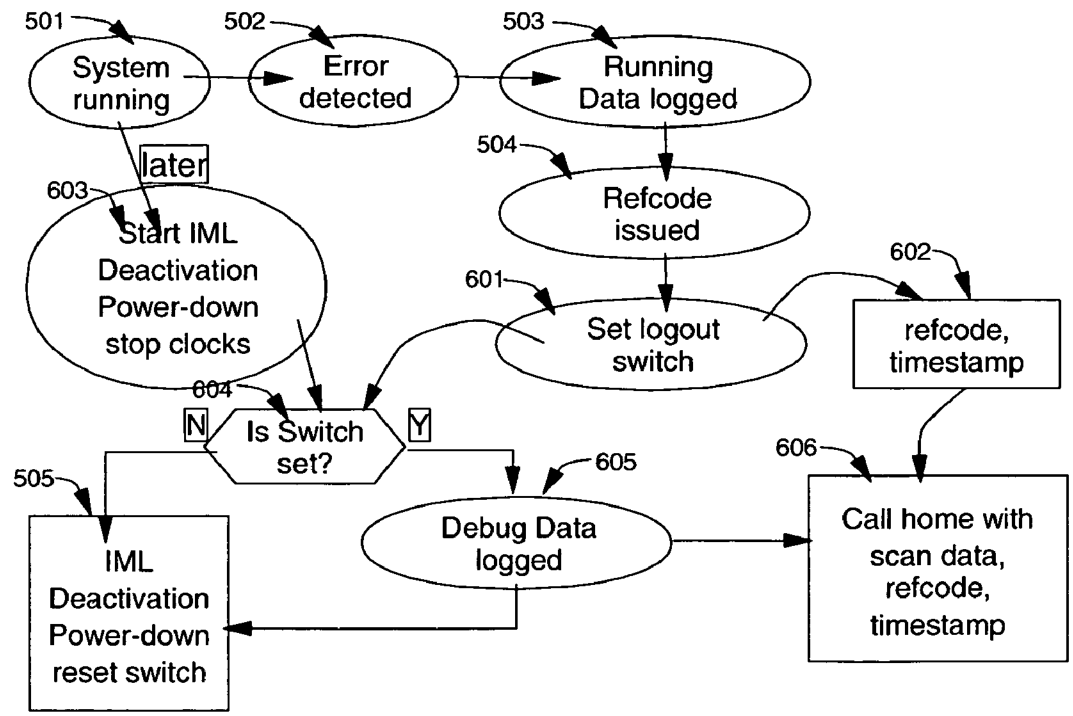
FIG. 6 illustrates one example of the invention which uses a deferred log switch to save deferred data.

Turning to the invention depicted in FIG. 6, notice that there is a running system, 501. An error event is detected, 502, data is logged, 503, and a reference code is issued, 504. This reference code, 504, is used to track the error event, 502. When the error event is detected, 502, the invention provides for setting a deferred logout switch, 601, along with storing reference code and timestamp, 602.

Some time later, when the machine is intended to power-down, IML, or restart, the clocks are stopped, 603, there is a check for the deferred logout switch, 604. If the deferred logout switch is not set, the system proceeds with the power-down, IML, or restart, 505. However, if the deferred logout switch is set, debug data is logged, 605. Additionally, the debug data, reference code, and original timestamp are combined and a call home is made, 606, with all the remaining debug data.

Figure 7:
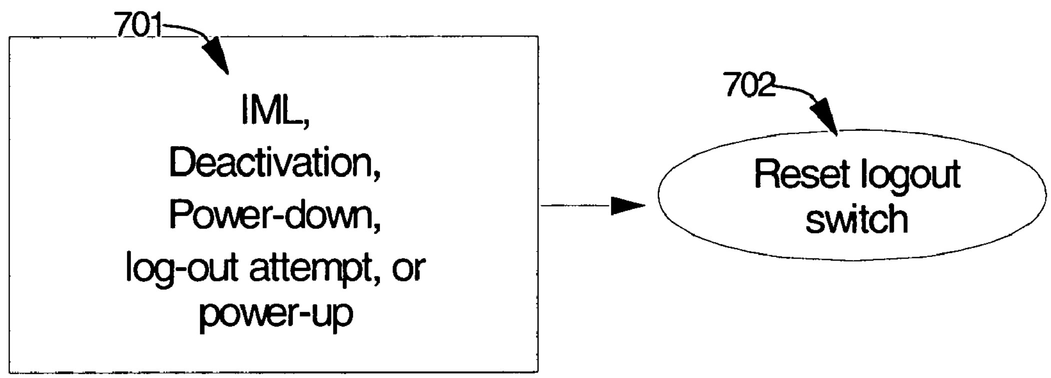
FIG. 7 illustrates one example of resetting the deferred log switch.

Turning to another aspect of the invention in FIG. 7, notice that any attempt to IML, power-down, deactivate, log-out, or power-up, 701, will reset the deferred logging switch, 702. This would be done after any deferred logging is attempted.

This switch reset is done because after these operations, the ring data will be destroyed and would no longer be useful. There is a chance that if the emergency power off switch (EPO) is turned off instead of a clean power-off sequence, that the deferred data will be lost and not logged. Therefore, a power-up should also reset the switch to avoid logging this useless reset data. Resetting the switch also protects against the useless data getting logged out over the previous logged data.

Figure 8:
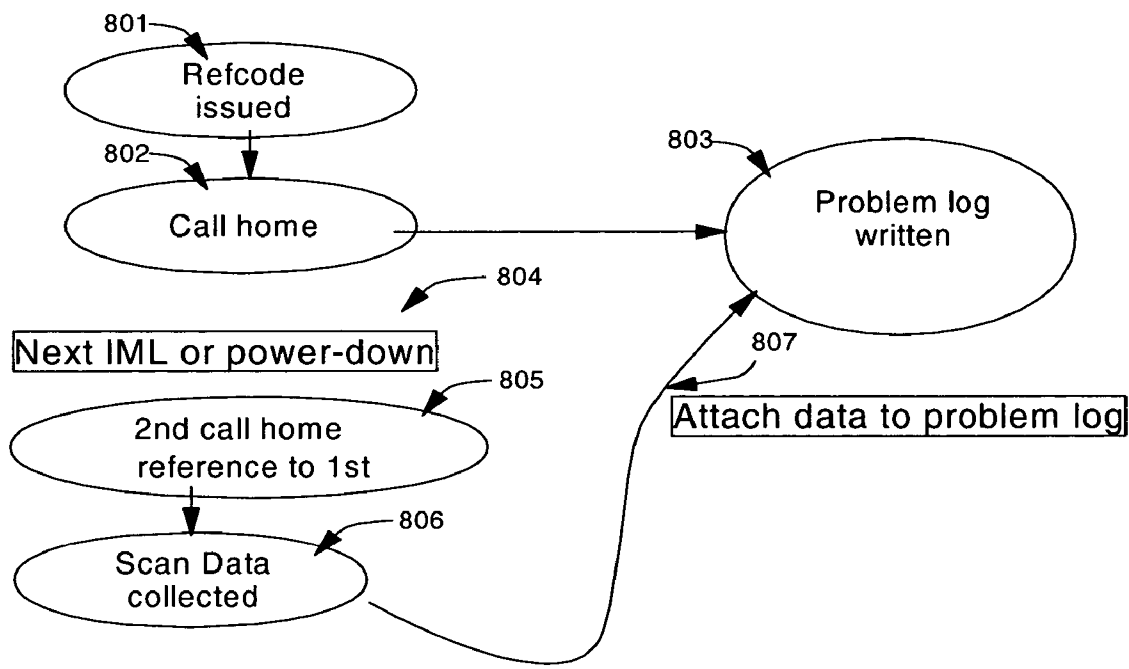
FIG. 8 illustrates one example of a process which logs original and deferred data and combines them in a tracking process.

Turning to another aspect of the invention in FIG. 8, notice that there is an original reference code issued, 801, followed by a call home for deferred maintenance, 802, which causes a problem log to be written, 803. At some later time, an IML or power-down, 804, occurs, causing a second call home, 805, which references the first call home, 802. This second call home, 805, includes collected scan ring data, 806, which is attached, 807, to the said problem log, 803.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for saving debug data in a computer system, comprising the steps of:

(a) detecting errors in said computer system over an extended period of time to create debug data;

(b) preserving said debug data for the said detected errors;

(d) setting external flags from outside said computer system indicating that said errors have occurred; and (e) upon detection of a disruptive event, checking the said flags and logging the said debug data corresponding to the said errors to provide computer system wide deferred logout of error information.

2. The method for saving debug data in a computer system according to claim 1, wherein said event is a power-down of the machine.

3. The method for saving debug data in a computer system according to claim 1, wherein said event is a restart of the machine.

4. The method for saving debug data in a computer system according to claim 1, wherein said step of preserving debug data is accompanied by the additional step of:

(c) logging some or all of said debug data while the machine is running.

5. The method for saving debug data in a computer system according to claim 1, wherein said setting flags includes saving the reference codes and timestamps of the said errors.

6. The method for saving debug data in a computer system according to claim 1, wherein said steps are accompanied by the additional step of:

(f) resetting the flags during a restart.

7. The method for saving debug data in a computer system according to claim 1, wherein said steps are accompanied by the additional step of:

(f) resetting the flags during a power-down.

8. The method for saving debug data in a computer system according to claim 1, wherein said steps are accompanied by the additional step of:

(f) resetting the flags during a power-up.

9. The method for saving debug data in a computer system according to claim 1, wherein said debug data includes the hardware state of the machine.

10. The method for saving debug data in a computer system according to claim 1, wherein the said debug data includes the software state of the machine.

11. The method for saving debug data in a computer system according to claim 1, wherein said step of logging the said debug data is done via scanning.

12. The method for saving debug data in a computer system according to claim 1, wherein said step of logging the said debug data is done via microcode dumps.

13. The method for saving debug data in a computer system according to claim 1, wherein said steps are accompanied by the additional steps of:

(g) calling home with debug data information;

(h) indicating the reference codes of the original errors;

(i) indicating the timestamps of the original errors.

14. The method for saving debug data in a computer system according to claim 1, wherein said step of setting flags is done manually.

15. The method for saving debug data in a computer system according to claim 1, wherein said flags can be viewed.

* * * * *